United States Patent
Diwan

(10) Patent No.: US 8,560,640 B2
(45) Date of Patent: Oct. 15, 2013

(54) SYSTEMS AND METHODS FOR PACKAGING AND DISTRIBUTING INFORMATION

(75) Inventor: Arif Diwan, Cranston, RI (US)

(73) Assignee: Stragent, LLC, Longview, TX (US)

( * ) Notice: Subject to any disclaimer, the term of this patent is extended or adjusted under 35 U.S.C. 154(b) by 0 days.

(21) Appl. No.: 12/699,853

(22) Filed: Feb. 3, 2010

(65) Prior Publication Data
US 2010/0150156 A1    Jun. 17, 2010

Related U.S. Application Data

(63) Continuation of application No. 10/929,146, filed on Aug. 27, 2004, which is a continuation of application No. 09/545,439, filed on Apr. 7, 2000, now Pat. No. 6,801,936.

(51) Int. Cl.
*G06F 15/16* (2006.01)

(52) U.S. Cl.
USPC .......................................................... 709/219

(58) Field of Classification Search
USPC .......................................................... 709/219
See application file for complete search history.

(56) References Cited

U.S. PATENT DOCUMENTS

| | | | |
|---|---|---|---|
| 4,002,842 A | 1/1977 | Meyr et al. | 179/15 |
| 4,090,035 A | 5/1978 | Popkin | 179/15 |
| 4,199,663 A | 4/1980 | Herzog | 370/85 |
| 4,471,481 A | 9/1984 | Shaw et al. | 370/85 |
| 4,562,573 A | 12/1985 | Murano et al. | 370/85 |
| 4,698,804 A | 10/1987 | Flores et al. | 370/86 |
| 4,727,370 A | 2/1988 | Shih | 340/825 |
| 5,155,727 A | 10/1992 | Borup et al. | 370/85.3 |
| 5,673,430 A | 9/1997 | Story | 455/4.2 |
| 5,758,257 A * | 5/1998 | Herz et al. | 725/116 |
| 5,819,284 A | 10/1998 | Farber et al. | 707/104 |
| 5,838,252 A | 11/1998 | Kikinis | 340/825.44 |
| 5,838,912 A | 11/1998 | Poon et al. | 395/200.34 |
| 5,893,091 A | 4/1999 | Hunt et al. | 707/3 |
| 5,936,547 A | 8/1999 | Lund | 340/825.44 |
| 5,974,447 A | 10/1999 | Cannon et al. | 709/206 |
| 6,021,433 A | 2/2000 | Payne et al. | 709/219 |
| 6,029,195 A | 2/2000 | Herz | 709/219 |
| 6,088,722 A | 7/2000 | Herz et al. | 709/217 |

(Continued)

FOREIGN PATENT DOCUMENTS

| | | |
|---|---|---|
| EP | 0094660 | 11/1983 |
| WO | WO9748051 | 12/1997 |

OTHER PUBLICATIONS

Aether Technologies, Enterprise Data Wireless Center: Feb. 1999, 15 pages.

(Continued)

*Primary Examiner* — Hussein Elchanti
*Assistant Examiner* — Maceeh Anwari
(74) *Attorney, Agent, or Firm* — Patrick E. Caldwell; The Caldwell Firm, LLC

(57) ABSTRACT

A system (190) provides information to multiple subscribers (105-125). The system (190) receives requests for different types of information from the subscribers (105-125) and stores rules for delivering the requested information. The system (190) gathers information from multiple information sources (145-155), packages at least some of the gathered information into customized bundles according to the received requests and the stored rules, and delivers the customized bundles to the subscribers (105-125) according to the stored rules.

109 Claims, 5 Drawing Sheets

(56) References Cited

U.S. PATENT DOCUMENTS

| | | |
|---|---|---|
| 6,202,062 B1 | 3/2001 | Cameron et al. .................. 703/3 |
| 6,230,205 B1 | 5/2001 | Garrity et al. .................. 709/231 |
| 6,236,991 B1 | 5/2001 | Frauenhofer et al. ............ 707/6 |
| 6,237,022 B1 | 5/2001 | Bruck et al. .................. 709/201 |
| 6,243,757 B1 | 6/2001 | Kanodia et al. ............... 709/235 |
| 6,308,175 B1 | 10/2001 | Lang et al. ...................... 707/10 |
| 6,317,783 B1 | 11/2001 | Freishtat et al. ............. 709/218 |
| 6,359,902 B1 * | 3/2002 | Putzolu ........................ 370/466 |
| 6,405,204 B1 | 6/2002 | Baker et al. |
| 6,442,598 B1 | 8/2002 | Wright et al. ................. 709/217 |
| 6,486,892 B1 | 11/2002 | Stern ............................. 345/760 |
| 6,546,488 B2 | 4/2003 | Dillon et al. .................. 713/181 |
| 6,594,682 B2 | 7/2003 | Peterson et al. ............. 709/102 |
| 6,594,692 B1 | 7/2003 | Reisman ...................... 709/219 |
| 6,745,333 B1 | 6/2004 | Thomsen ...................... 713/201 |
| 6,801,946 B1 | 10/2004 | Child et al. ................... 709/230 |
| 7,523,167 B2 | 4/2009 | Thomas et al. ............... 709/206 |
| 2001/0003828 A1 | 6/2001 | Peterson et al. ............. 709/219 |
| 2001/0034658 A1 | 10/2001 | Silva et al. ...................... 705/26 |
| 2003/0115319 A1 | 6/2003 | Dawson et al. ............... 709/224 |
| 2005/0132219 A1 | 6/2005 | Robert .......................... 713/201 |
| 2005/0283613 A1 * | 12/2005 | Carpentier et al. ........... 713/180 |

OTHER PUBLICATIONS

Aether, "Mobeo Products," www.Mobeo.com/product/html. Jan. 28, 2000 (print date). 3 pages.

U.S. Appl. No. 09/545,439, filed Apr. 7, 2000.

U.S. Appl. No. 10/929,146, filed Aug. 27, 2004.

U.S. Appl. No. 12/699,850, filed Feb. 3, 2010.

Appeal Brief from U.S. Appl. No. 09/545,439, filed Apr. 19, 2004.

Baynetworks, "Exploiting Internetwork Multicast Services." www.baynetworks.com/products/reports/multicast.html, Jul. 29, 1999 (print date), 22 pages.

EntryPoint, "EntryPoint: The Internet Toolbar that really delivers," www.entrypoint.com, Jan. 26, 2000 (print date), 4 pages.

Netscape, "Netcenter, " www.netcenter.com, Jan. 26, 2000 (print pages), 2 pages.

Notice of Allowance from U.S. Appl. No. 09/545,439 which was mailed on Jun. 1, 2004.

Office Action from U.S. Appl. No. 09/545,439 which was mailed on Jan. 21, 2003.

Office Action from U.S. Appl. No. 09/545,439 which was mailed on Oct. 27, 2003.

Office Action from U.S. Appl. No. 09/545,439 which was mailed on Dec. 12, 2001.

Office Action from U.S. Appl. No. 09/545,439 which was mailed on Jun. 13, 2003.

Office Action from U.S. Appl. No. 09/545,439 which was mailed on Jun. 25, 2001.

Office Action from U.S. Appl. No. 09/545,439 which was mailed on Aug. 21, 2003.

Office Action from U.S. Appl. No. 10/929,146 which was mailed on Feb. 23, 2009.

Office Action from U.S. Appl. No. 10/929,146 which was mailed on Feb. 5, 2010.

Office Action from U.S. Appl. No. 10/929,146 which was mailed on Mar. 23, 2010.

Office Action from U.S. Appl. No. 10/929,146 which was mailed on May 24, 2011.

Office Action from U.S. Appl. No. 10/929,146 which was mailed on Sep. 16, 2010.

Office Action from U.S. Appl. No. 11/042,291 which was mailed on Oct. 23, 2007.

Office Action from U.S. Appl. No. 12/699,850 which was mailed on May 25, 2011.

Office Action from U.S. Appl. No. 12/699,850 which was mailed on Aug. 24, 2010.

PointCast, "Enterprise Solutions," pioneer.pointcast.com/products/server, Jan. 26, 2000 (print date), 4 pages.

R. Ramanathan, "RFC2102," www.faqs/org/rfcs/rfc2122.html, Feb. 1997, 16 pages.

StarBurst Communications, "StarBurst Allowed Patent Application on Multicast Technology that has Potential Break Looming Internet Logjam." www.starburstcom.com/prpatent.htm, Jul. 29, 1996, 3 pages.

WebCanal, "Global Information Broadcast," monet.inria.fr/white/index.html, Dec. 31, 1997, 9 pages.

* cited by examiner

SYSTEMS AND METHODS FOR PACKAGING AND DISTRIBUTING INFORMATION

CROSS-RELATED APPLICATION

The present application is a continuation of U.S. application Ser. No. 09/545,439, filed Apr. 7, 2000, the specification of which is incorporated herein by reference in its entirety.

BACKGROUND OF THE INVENTION

A. Field of the Invention

The present invention relates generally to information distribution systems and, more particularly, to systems and methods that facilitate the distribution of information from various sources to multiple subscribers.

B. Description of Related Art

Over the last decade, networks, such as the Internet, have expanded by many orders of magnitude. The types of information provided over these networks have also increased and now include streaming audio, video, multi-player network interactive games, and other multimedia information. With the vast amount of information available, it has become extremely important to distribute the information in as efficient and economical a manner as possible, especially at the edges of the networks, where mobile nodes may tie into wireless networks.

Some conventional systems use broadcast technology to distribute information. Broadcasting permits information providers to send a single message that is replicated and transmitted across a network. If a user desires information from one or more broadcast streams, the user needs to identify the information providers that supply the information and constantly monitor the network for broadcast messages from the identified information providers. These conventional systems do not permit the user to customize the delivery of the information.

Other conventional systems use multicast technology to distribute information. Multicasting permits information providers to send a single message that is replicated and transmitted to hundreds and thousands of subscribers across a network. If a user desires information in this case, the user must determine what information providers supply the desired information and subscribe to their information delivery services. It is not always easy, however, to find these information providers and once they are found, they may not permit the user to customize the delivery of the information.

As a result, a need exists for a system that facilitates the information request process and permits users to customize the types of information they receive.

SUMMARY OF THE INVENTION

Systems and methods consistent with the present invention address this need by providing at least one agent that gathers information from multiple sources, packages the information into customized bundles, and delivers the bundles to subscribers according to a set of rules using multicast routing techniques.

In accordance with the purpose of the invention as embodied and broadly described herein, a system provides information to multiple subscribers. The system receives requests for different types of information from the subscribers and stores rules for delivering the requested information. The system gathers information from multiple information sources, packages at least some of the gathered information into customized bundles according to the received requests and the stored rules, and delivers the customized bundles to the subscribers according to the stored rules.

In another implementation consistent with the present invention, an agent connects to at least one information source and at least one subscriber. The agent includes a memory and a processor. The memory stores instructions. The processor executes the instructions in the memory to collect different types of information from the information sources, package at least some of the collected information into bundles based on preferences of the subscribers, generate multicast messages containing the bundles, and transmit the multicast messages to appropriate ones of the subscribers.

In a further implantation consistent with the present invention, a method for delivering information includes receiving requests for different types of information from multiple subscribers; collecting information from multiple information sources over a network; identifying parts of the collected information common to the requests of a group of the subscribers; generating a multicast message containing the common information; and transmitting the multicast message to the group of subscribers.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention efficiently and economically distribute information from multiple sources to multiple subscribers. The systems and methods gather information from the sources, package them into customized bundles according to requests and rules defined by the subscribers and/or agent managers, and transmit the bundles to the subscribers based on the rules using Internet protocol (IP) multicast routing techniques. IP multicast, coupled with multicast routing techniques, provides a powerful mechanism by which to distribute information to a very large number of subscribers from a single source.

Exemplary Network

Figure 1:
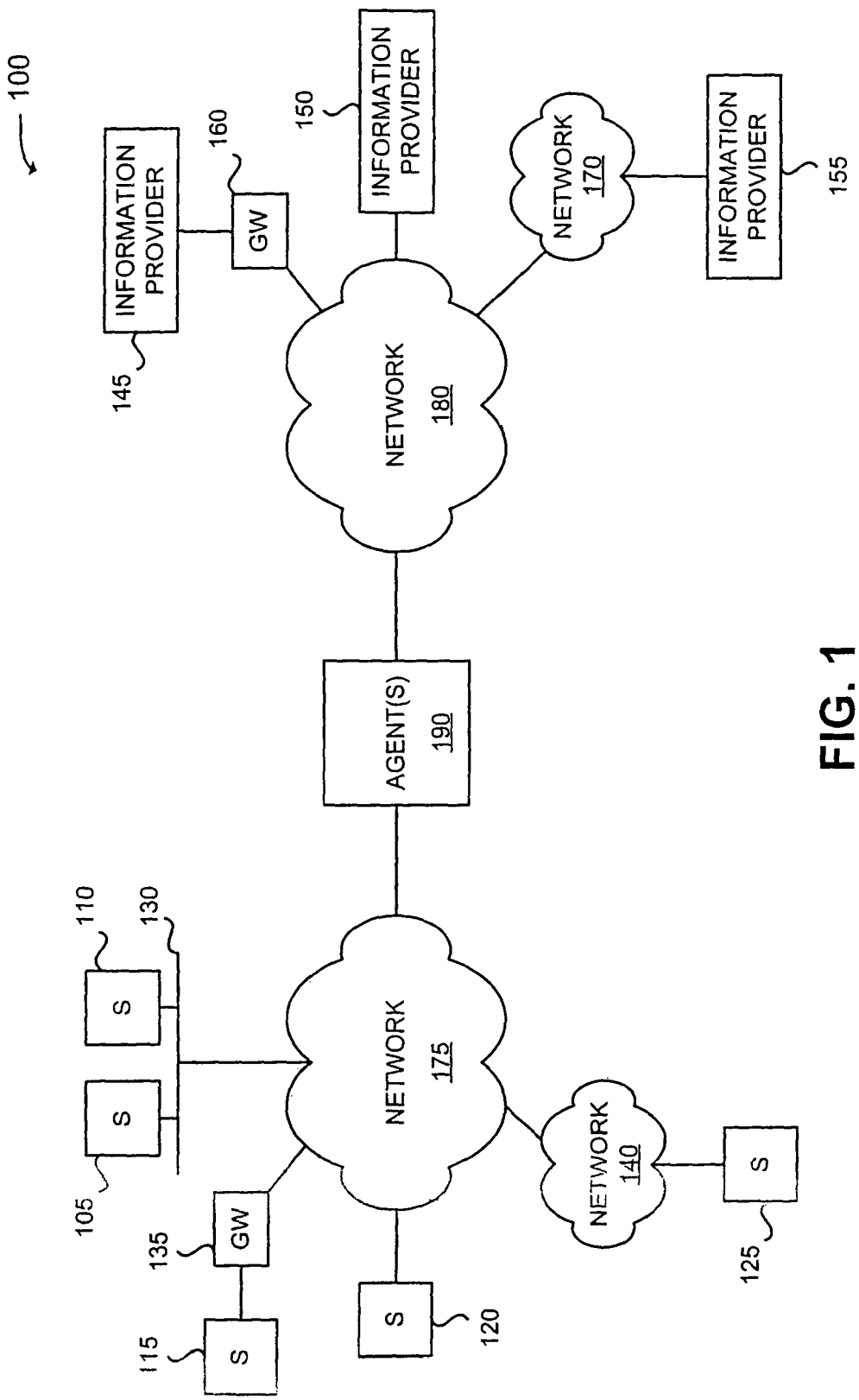
FIG. 1 is a diagram of an exemplary network in which systems and methods consistent with the present invention may be implemented.

FIG. 1 is a diagram of an exemplary network 100 in which systems and methods consistent with the present invention may be implemented. The network 100 may include multiple subscribers 105-125 and multiple information providers 145-155 connected via networks 175 and 180, respectively, to one or more agents 190. The networks 175 and 180 may include the Internet, an intranet, a wide area network (WAN), a metropolitan area network (MAN), a local area network (LAN), a public telephone network, such as the public switched telephone network (PSTN), or a similar network. In addition the networks 175 and 180 may comprise a single network or separate networks, such as the public switched telephone network.

The subscribers 105-125 may include any combination of personal computers, personal digital assistants (PDAs), laptop, mobile or portable telephones, and similar communication devices that request information supplied by one or more of the information providers 145-155. The subscribers 105-125 may connect to the network 175 in several different ways, including wired, wireless, and optical connections. For example, subscribers 105 and 110 connect to the network 175 via a LAN 130; subscriber 115 connects to the network 175 via a conventional gateway 135; subscriber 120 connects to the network 175 via a wired, wireless, or optical connection; and subscriber 125 connects to the network 175 via a separate network 140 that may include the Internet, an intranet, a WAN, a LAN, etc. Five subscribers have been shown in FIG. 1 for simplicity. Additional subscribers may also be included in the network 100.

The information providers 145-155 may include servers, personal computers, laptops, or similar devices that supply information to whomever wants it and/or subscribes to the service. The information providers 145-155 may broadcast streams of information onto the network 180. One example of an information provider may include a news web site, such as NBC.com, that broadcasts streams of news information.

Alternatively, the information providers 145-155 may transmit multicast messages containing information. In this case, the information providers 145-155 may receive requests for information according to any conventional protocol, such as the hyper text transfer protocol (HTTP), the simple mail transfer protocol (SMTP), the network virtual terminal protocol (Telnet), and the like. In response to the requests, the information providers 145-155 may generate multicast messages that include the requested information, such as stock quotes, weather or sports reports, etc., and transmit them using conventional multicast routing techniques. One example of an information provider may include the web site Weather.com that provides up-to-date weather reports to its subscribers.

To accomplish the broadcast or multicast transmissions, the information providers 145-155 may connect to the network 180 in a number of different ways, including wired, wireless, and optical connections. For example, information provider 145 connects to the network 180 via a conventional gateway 160; information provider 150 connects to the network 180 via a wired, wireless or optical connection; and information provider 155 connects to the network 180 via a separate network 170 that may include the Internet, an intranet, a WAN, a LAN, etc. Three information providers have been shown in FIG. 1 for simplicity. Additional information providers may also be included in the network 100.

Figure 2:
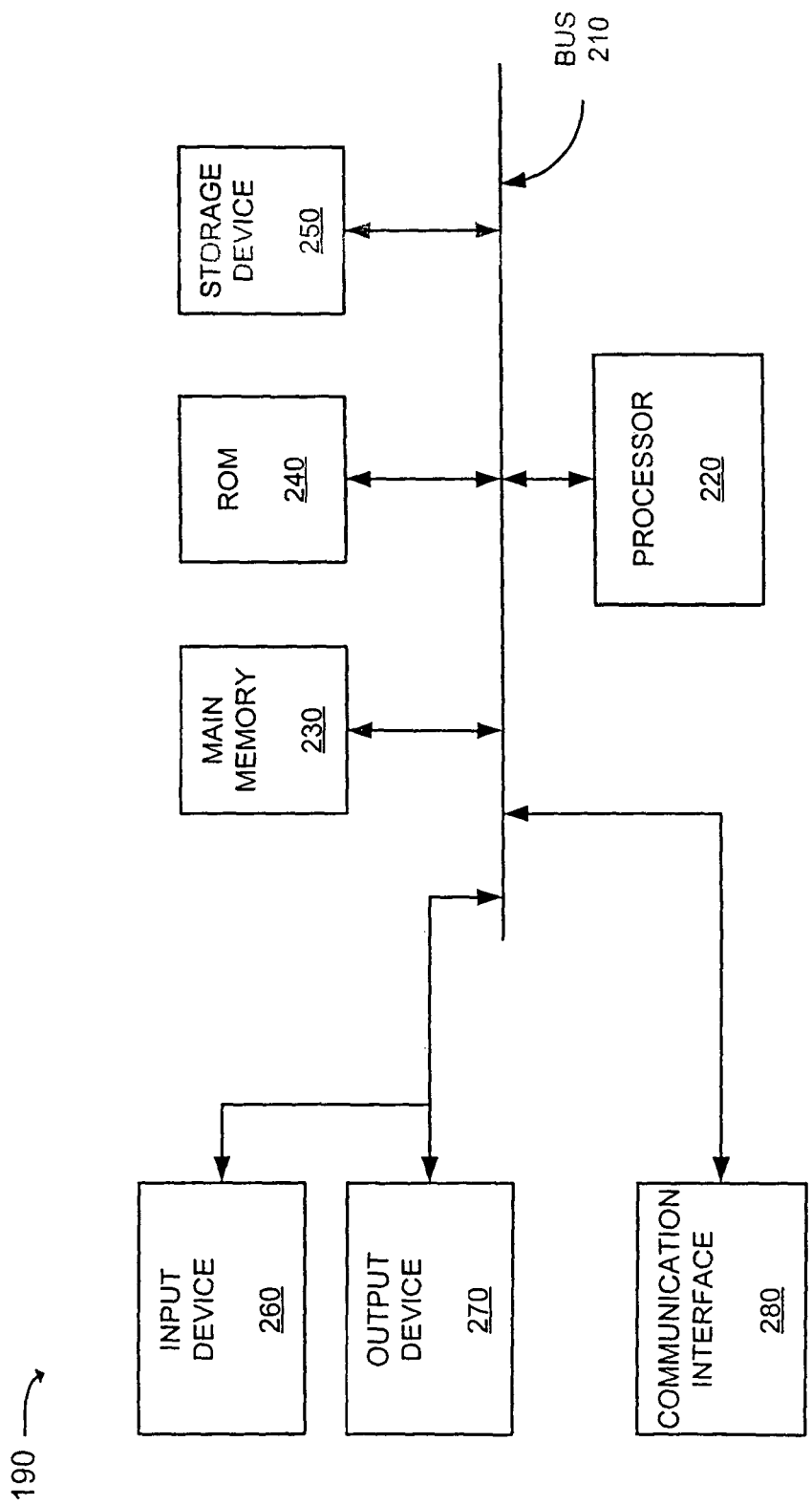
FIG. 2 is a detailed diagram of an agent in the network of FIG. 1.

The agent(s) 190 take requests from the subscribers 105-125 for supplying them with information supplied by the information providers 145-155. FIG. 2 is an exemplary diagram of an agent 190 in one implementation consistent with the present invention. In this implementation, the agent 190 is a stand-alone device. In other implementations, the agent 190 may be a virtual entity whose functions are distributed over several devices or implemented as software within a single device, such as network router.

The agent 190 may include a bus 210, a processor 220, a main memory 230, a read only memory (ROM) 240, a storage device 250, an input device 260, an output device 270, and a communication interface 280. The bus 210 permits communication among the components of the agent 190.

The processor 220 may include any type of conventional processor or microprocessor that interprets and executes instructions. The main memory 230 may include a random access memory (RAM) or another dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input device 260 may include any conventional mechanism that permits an operator to input information to the agent 190, such as a keyboard, a mouse, a pen, voice recognition and/or biometric mechanisms, etc. The output device 270 may include any conventional mechanism that outputs information to the operator, including a display, a printer, a pair of speakers, etc. The communication interface 280 may include any transceiver-like mechanism that enables the agent 190 to communicate with other devices and/or systems. For example, the communication interface 280 may include mechanisms for communicating with another device or system via a network, such as networks 175 and 180.

As will be described in detail below, an agent 190, consistent with the present invention, repackages information from information providers into customized bundles and provides the bundles to subscribers in accordance with a set of rules using, for example, IP multicast routing techniques. The agent 190 performs these tasks in response to the processor 220 executing sequences of instructions contained in, for example, memory 230. These instructions may be read into memory 230 from another computer-readable medium, such as the storage device 250, or from another device via the communication interface 280.

Execution of the sequences of instructions contained in memory 230 causes processor 220 to perform processes that will be described later. Alternatively, hardwired circuitry may be used in place of or in combination with software instructions to implement processes consistent with the present invention. Thus, the present invention is not limited to any specific combination of hardware circuitry and software.

Exemplary Subscriber Database

Figure 3:
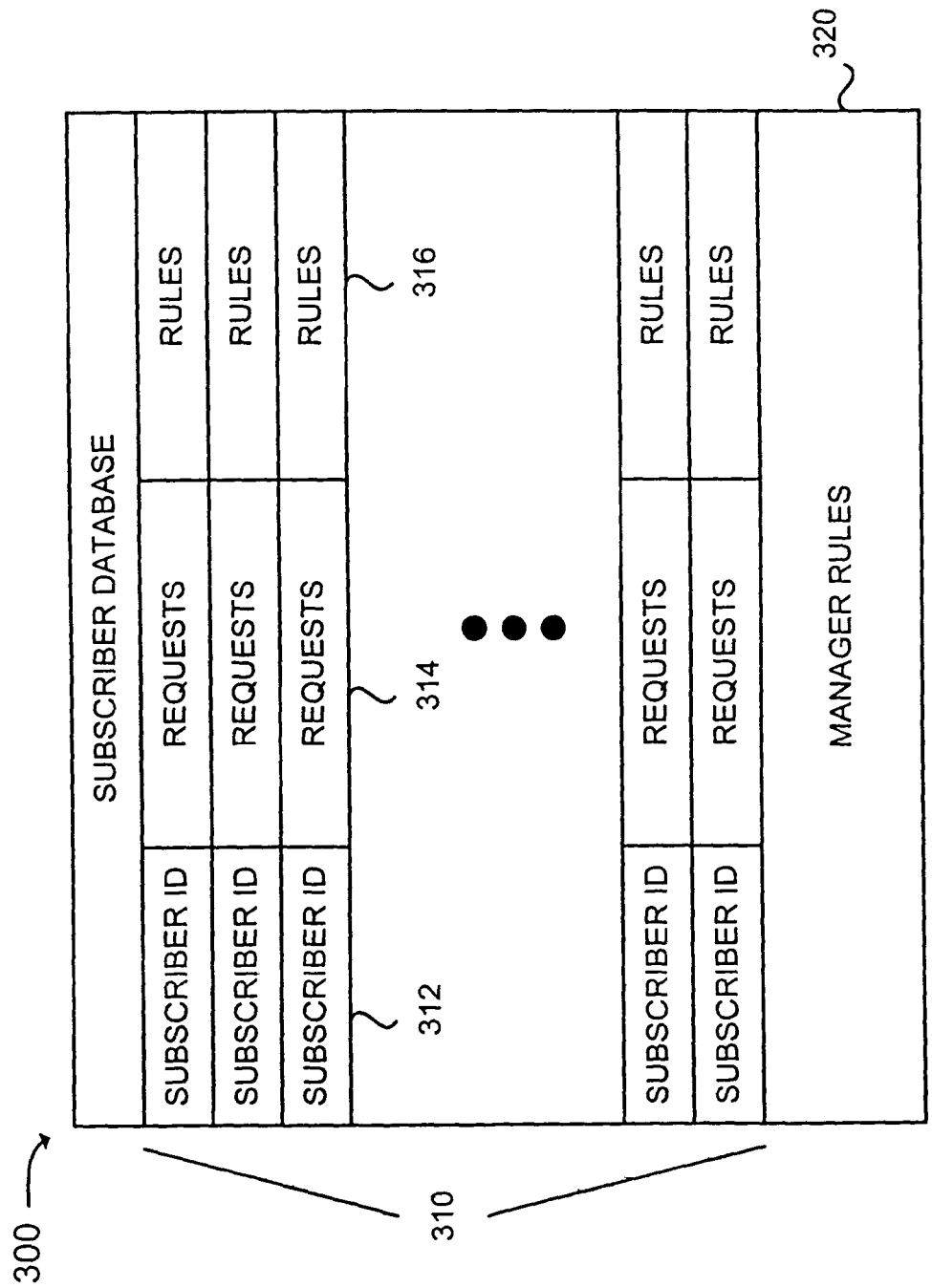
FIG. 3 is an exemplary diagram of a subscriber database in the agent of FIG. 2.

The agent 190 may store a subscriber database that controls packaging and distribution operations performed by the agent 190. FIG. 3 is an exemplary diagram of a subscriber database 300 consistent with the present invention. The subscriber database 300 may physically reside in the storage device 250 or main memory 230 of the agent 190 or may be stored in an external memory device accessible by the agent 190 via the communication interface 280.

The subscriber database 300 may include multiple entries 310, corresponding to multiple subscribers, and manager rules 320. Each of the entries 310 may include a subscriber identifier field 312, a requests field 314, and a rules field 316. The subscriber identifier field 312 may store a unique identifier for a particular subscriber or group of subscribers.

The requests field 314 may store information that indicates the types of information that the subscriber(s) identified in the corresponding subscriber identifier field 312 desires. The requests field 314 may include, for example, requests for stock quotes, current weather conditions, sports scores, news headlines, etc. The requests may be general or specific in nature. For example, a subscriber might request stock quotes for GTE stock, weather conditions for Boston, NBA scores, and all news headlines concerning Fortune 500 companies.

The rules field 316 may store rules that control the manner in which the agent 190 bundles and distributes the information it receives from the information providers. The rules might specify whether the subscriber wants the agent 190 to always complete a bundle or to fulfill partial orders (i.e., a bundle that includes a portion, but not all, of the information requested by the subscriber), the intervals at which the bundles must be released to subscriber, the form that the subscriber wants the bundle delivered (e.g., in text or audio format), etc.

The manager rules 320 include rules established by an agent manager. The agent manager may be a person or system that establishes a set of "ground rules" for the agent 190 to help the agent 190 operate in an efficient and economical manner. These rules might specify whether to form unions and intersections of requests to generate bundles of optimal size that will satisfy the requests of several subscribers, and whether to generate bundles with less and/or more information than the subscribers request.

Processing for Registering a Subscriber

Figure 4:
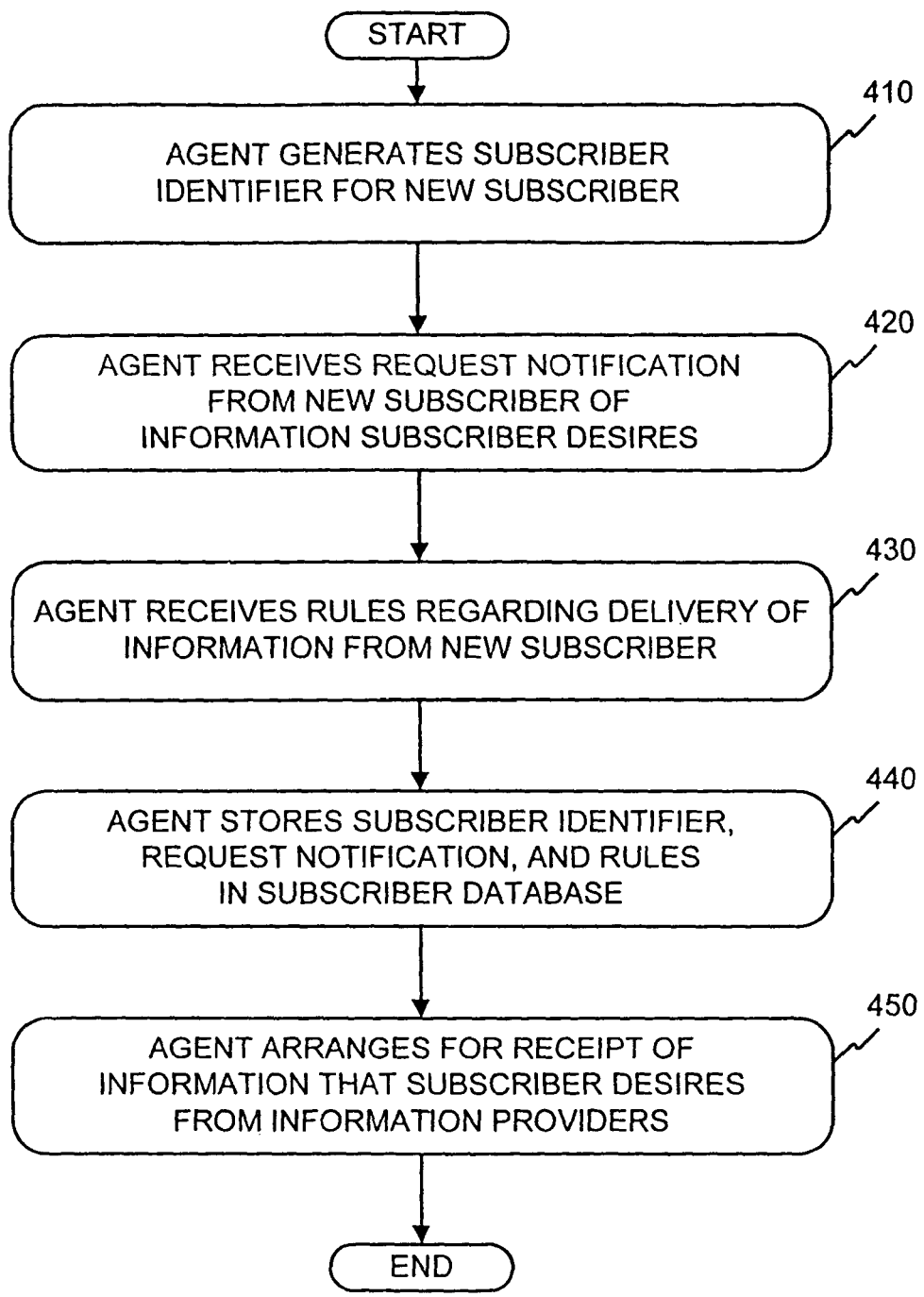
FIG. 4 is a flowchart of processing for registering with an agent to receive customized bundles of information.

FIG. 4 is a flowchart of processing for registering with an agent to receive customized bundles of information. When a subscriber desires to register with an agent, such as agent 190, the subscriber contacts the agent 190 in a conventional manner. For example, the subscriber may access a web site of the agent 190 via a network, such as the Internet, contact the agent 190 via a data or voice connection, email the agent 190, or establish contact with the agent 190 via other mechanisms. Once the subscriber contacts the agent 190, the agent 190 may generate a subscriber identifier for the new subscriber [step 410]. The agent 190 may automatically generate a numeric or alphanumeric identifier for the subscriber or may permit the subscriber to provide an identifier.

The agent 190 prompts the subscriber for the type(s) of information that the subscriber desires to receive. For example, the agent 190 may present the subscriber with a list of available information services and permit the subscriber to select from the list. Alternatively, the agent 190 may permit the subscriber to specify the information services that the subscriber desires without presenting the subscriber with a list. In any event, the agent 190 receives a request notification (i.e., a selection) from the subscriber indicating the information services that the subscriber desires [step 420].

The agent 190 prompts the subscriber for delivery rules that indicate the manner in which the subscriber wants the information delivered. For example, the subscriber might specify that the information must be delivered by 5:00 PM each day, whether the subscriber wants all of the information or will accept some of it, etc. The subscriber provides the rules to the agent 190 [step 430]. The agent 190 then stores the subscriber identifier, request notification, and rules in the appropriate fields of an entry 310 in the subscriber database 300 [step 440].

If the subscriber requests information that the agent 190 does not already obtain for another subscriber, the agent 190 may identify the information provider that broadcasts the information and arrange to receive the broadcast stream [step 450]. Alternatively, the agent 190 may request delivery of the information from an information provider [step 450]. In this case, the agent 190 may obtain a multicast group identification (ID) address from the information provider for use by the agent 190 in receiving the information provided by the information provider. The agent 190 then begins listening for information form information providers using one or more multicast group ID addresses.

Processing for Packaging and Distributing Information

Figure 5:
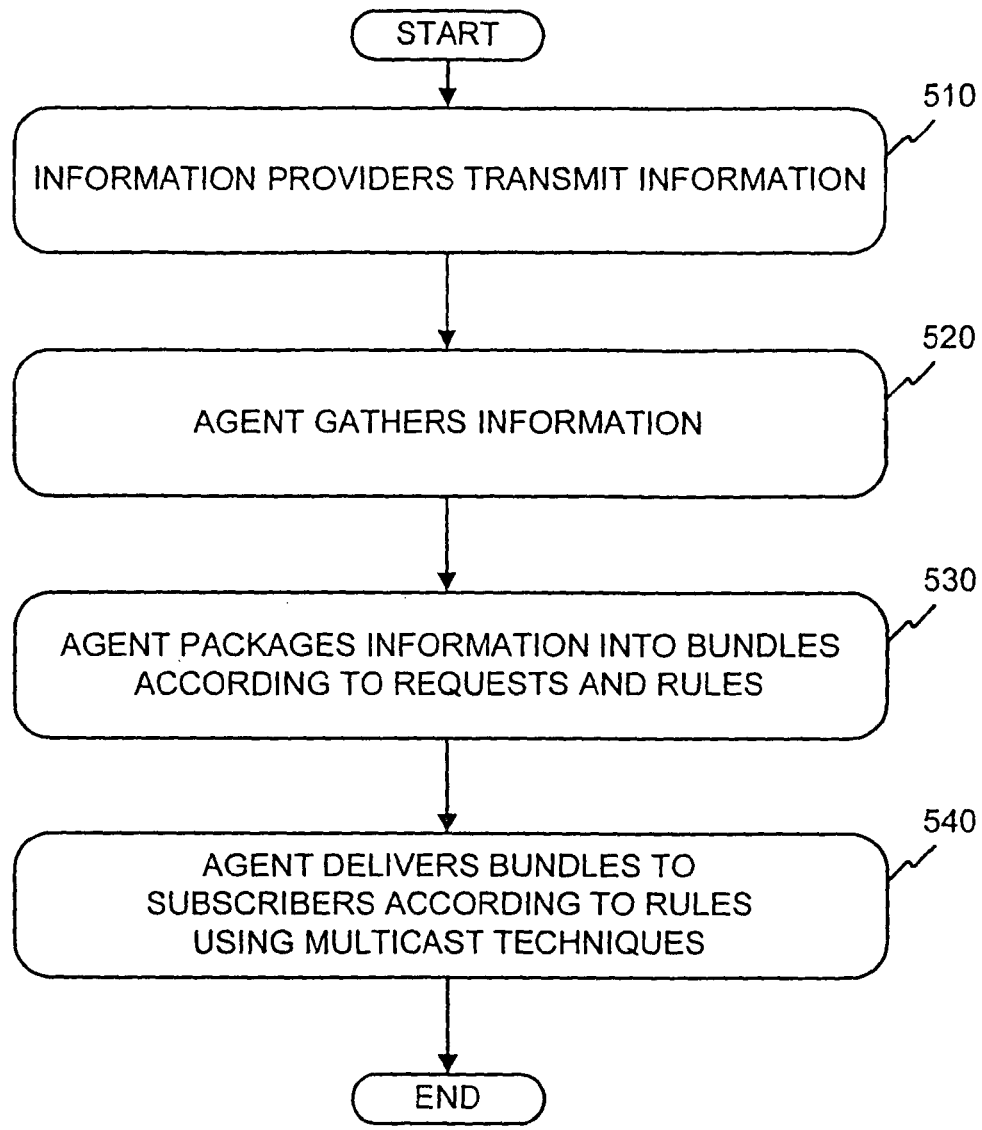
FIG. 5 is a flowchart of processing for packaging and distributing information to subscribers.

FIG. 5 is a flowchart of processing for packaging and distributing information to subscribers. In their usual course of business, information providers transmit information, such as stock quotes, sports scores, etc., onto the network 180 [step 510]. The information providers may transmit the information using broadcast or multicast techniques. Members of a multicast group are identified by a common multicast group ID address. The agent 190 listens for the broadcast streams and, using its multicast group ID addresses, the multicast messages to select the information its subscribers desire [step 520].

Based on the requests and rules stored in its subscriber database 300, the agent 190 packages the messages into customized bundles [step 530]. The requests might indicate, for example, that a particular subscriber wants to receive stock quotes for GTE stock and sports scores relating to NBA games. The rules might dictate that the agent 190 form unions and intersections of subscriber requests to generate bundles of optimal size. These bundles might actually contain more or less information than desired by the particular subscribers. In the case where the bundles contain more information, software used by the subscribers may discard the extraneous information.

One the bundles of information have been generated, the agent 190 distributes them to the subscribers [step 540]. The agent 190 may use IP multicast techniques to distribute a bundle to all of the subscribers requesting the information. The subscriber receives the information, possibly using a multicast group ID address, discards any extraneous information, and provides the requested information to a user. For example, the subscriber may present the requested information to the user as scrolling text in a pop-up window on a display.

CONCLUSION

Systems and methods consistent with the present invention improve the deliver of information from multiple sources by providing one or more agents that receive the information from the sources, package the information into customized bundles, and deliver the bundles according to a set of rules using multicast routing techniques.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, the agent 190 has been described as passively listening for multicast messages from information providers. In another implementation consistent with the present invention, the agent 190 actively gets the desired information by accessing web sites, for example, of the information providers.

In yet another implementation consistent with the present invention, the subscribers subscribe to various information services provided by the information providers. The information providers provide the subscribers with multicast group ID addresses. The subscribers, in turn provide the group ID addresses to the agent 190. The agent 190, thereafter, intercepts messages from the information providers intended for the subscribers and bundles the information for them.

The scope of the invention is defined by the claims and their equivalents.

What is claimed is:

1. A method for providing information to a plurality of subscribers, comprising:
    receiving requests for different types of information from the subscribers, by:
        providing a list of available information services that supply the different types of information to each of the subscribers, and
        receiving a selection of one or more of the information services from the list;
    storing rules for delivering the requested information, the rules including subscriber rules from the subscribers that dictate a manner of delivery of the requested information, the rules further including general delivery rules that pertain to all of the subscribers;
    gathering information directly from a plurality of information providers;
    packaging at least some of the gathered information into customized bundles according to the received requests and the stored rules; and
    delivering the customized bundles to the subscribers according to the stored rules.

2. The method of claim 1, wherein the gathering includes:
    contacting the information providers to request delivery of the requested information.

3. The method of claim 2, wherein the gathering further includes:
    obtaining a multicast group identification address from each of the information providers, and
    listening for messages from the information providers that contain one of the multicast group identification addresses.

4. The method of claim 1, wherein the gathering includes:
    listening for broadcast streams from the information providers that contain the requested information.

5. The method of claim 1, wherein the packaging includes:
    grouping information that satisfies the requests of multiple ones of the subscribers.

6. The method of claim 1, wherein the packaging includes:
    generating multicast messages that include the customized bundles.

7. The method of claim 6, wherein the delivering includes:
    transmitting the multicast messages to the subscribers using Internet protocol multicast and taking advantage of multicast routing protocols.

8. The method of claim 6, wherein the delivering includes:
    transmitting the multicast messages to the subscribers using Internet multicast group addresses and taking advantage of Internet protocol multicast routing techniques.

9. The method of claim 1, wherein the information is gathered directly from the plurality of information providers in an automated manner.

10. A system for providing information to a plurality of subscribers, comprising:
    means for receiving requests for different types of information from the subscribers, by:
        providing a list of available information services that supply the different types of information to each of the subscribers, and
        receiving a selection of one or more of the information services from the list;
    means for storing rules for delivering the requested information, the rules including subscriber rules from the subscribers that dictate a manner of delivery of the requested information, the rules further including general delivery rules that pertain to all of the subscribers;
    means for gathering information directly from a plurality of information providers;
    means for packaging at least some of the gathered information into customized bundles according to the received requests and the stored rules; and
    means for delivering the customized bundles to the subscribers according to the stored rules.

11. The system of claim 10, wherein the system is operable such that the information is gathered directly from the plurality of information providers in an automated manner.

12. A system that provides information to a plurality of users, comprising:
    a communication interface configured to receive requests for different types of information from the users, by:
        providing a list of available information services that supply the different types of information to each of the users, and
        receiving a selection of one or more of the information services from the list;
    a memory configured to store rules for delivering the requested information, the rules including user rules from the users that dictate a manner of delivery of the requested information, the rules further including general delivery rules that pertain to all of the users; and
    a processor configured to gather information directly from a plurality of information providers, package at least some of the gathered information into customized bundles according to the received requests and the stored rules, and deliver the customized bundles to the users according to the stored rules.

13. The system of claim 12, wherein the processor is further configured to contact the information providers to request delivery of the requested information.

14. The system of claim 13, wherein the processor is further configured to obtain a multicast group identification address from each of the information providers and listen for messages from the information providers that contain one of the multicast group identification addresses.

15. The system of claim 12, wherein the processor is further configured to listen for broadcast streams from the information providers that contain the requested information.

16. The system of claim 12, wherein the processor is further configured to group information that satisfies the requests of multiple ones of the users.

17. The system of claim 12, wherein the processor is further configured to generate multicast messages that include the customized bundles.

18. The system of claim 17, wherein the processor is further configured to transmit the multicast messages to the users taking advantage of multicast routing techniques.

19. The system of claim 17, wherein the processor is further configured to transmit the multicast messages to the users taking advantage of Internet protocol multicast routing techniques.

20. The system of claim 12, wherein the system is operable such that the information is gathered directly from the plurality of information providers in an automated manner.

21. A non-transitory computer-readable medium that stores instructions executable by at least one processor to perform a method for providing information to a plurality of subscribers, comprising:
gathering information from a plurality of information providers, at least in part, in an automated manner;
packaging at least some of the gathered information into customized bundles based on a plurality of information requests and delivery rules, the information requests including requests from the subscribers for different types of information, the delivery rules including rules that control delivery of the requested information; and
delivering the customized bundles to the subscribers according to the delivery rules;
wherein the instructions are operable such that available information services are presented that supply the different types of information for receiving a selection of one or more of the information services, and the rules include one or more subscriber rules that are based on subscriber input and that dictate a manner of delivery of the requested information, and one or more general delivery rules that pertain to the subscribers.

22. The computer-readable medium of claim 21, wherein the instructions are operable such that the gathering includes:
contacting the information providers to request delivery of the requested information.

23. The computer-readable medium of claim 22, wherein the instructions are operable such that the gathering further includes:
obtaining a multicast group identification address from each of the information providers, and
listening for messages from the information providers that contain one of the multicast group identification addresses.

24. The computer-readable medium of claim 21, wherein the instructions are operable such that the gathering includes:
listening for broadcast streams from the information providers that contain the requested information.

25. The computer-readable medium of claim 21, wherein the instructions are operable such that the packaging includes:
grouping information that satisfies the requests of multiple ones of the subscribers.

26. The computer-readable medium of claim 21, wherein the instructions are operable such that the packaging includes:
generating multicast messages that include the customized bundles.

27. The computer-readable medium of claim 26, wherein the instructions are operable such that the delivering includes:
transmitting the multicast messages to the subscribers.

28. The computer-readable medium of claim 26, wherein the instructions are operable such that the delivering includes:
transmitting the multicast messages to the subscribers taking advantage of Internet protocol multicast routing techniques.

29. The computer-readable medium claim 21, wherein the instructions are operable such that information requests are defined by an agent manager.

30. The computer-readable medium of claim 21, wherein the instructions are operable such that the information requests are defined by subscribers.

31. The computer-readable medium of claim 21, wherein the instructions are operable such that the subscribers include subscriber devices.

32. The computer-readable medium of claim 21, wherein the instructions are operable such that the requested information includes at least one of audio data, video data, or textual data.

33. The computer-readable medium of claim 21, wherein the instructions are operable such that the requested information includes audio data, video data, and textual data.

34. The computer-readable medium of claim 21, and further comprising:
contacting the information providers to request delivery of the requested information.

35. The computer-readable medium of claim 21, and further comprising:
obtaining a multicast group identification address from at least one of the information providers.

36. The computer-readable medium of claim 21, and further comprising:
receiving multicasted information from the information providers.

37. The computer-readable medium of claim 21, wherein the instructions are operable such that the gathered information is gathered via a plurality of networks.

38. The computer-readable medium of claim 21, wherein the instructions are operable such that the gathered information is gathered from the information providers by way of a broadcast.

39. The computer-readable medium of claim 21, further comprising:
identifying parts of the gathered information common to the requests of a group of the subscribers.

40. The computer-readable medium of claim 39, wherein the instructions are operable such that the delivery rules indicate a manner in which at least a portion of the identified parts of the gathered information common to the requests of the group of the subscribers is presented.

41. The computer-readable medium of claim 39, wherein the instructions are operable such that the delivery rules cause at least one bundle of the identified parts of the gathered information common to the requests of the group of the subscribers to be delivered in an efficient or economical manner.

42. The computer-readable medium of claim 39, wherein the instructions are operable such that the delivery rules specify a manner for presenting at least a portion of the identified parts of the gathered information.

43. The computer-readable medium of claim 39, wherein the instructions are operable such that the delivery rules dictate a manner in which at least a portion of the identified parts of the gathered information is bundled and presented via subscriber devices.

44. The computer-readable medium of claim 39, wherein the instructions are operable such that the delivery rules indicate whether to fulfill a partial order.

45. The computer-readable medium of claim 44, wherein the instructions are operable such that the partial order includes a bundle that includes only a portion of the gathered information requested by one of the subscribers.

46. The computer-readable medium of claim 39, wherein the instructions are operable such that the delivery rules indicate an aspect of time at which at least a portion of the identified parts of the gathered information are to be delivered to subscriber devices.

47. The computer-readable medium of claim 39, wherein the instructions are operable such that the delivery rules indicate an interval at which at least a portion of the identified parts of the gathered information are to be delivered to subscriber devices.

48. The computer-readable medium of claim 39, wherein the instructions are operable such that the delivery rules indicate a form in which at least a portion of the identified parts of the gathered information are to be delivered to subscriber devices.

49. The computer-readable medium of claim 48, wherein the instructions are operable such that the form includes an audio format.

50. The computer-readable medium of claim 48, wherein the instructions are operable such that the form includes a textual format.

51. The computer-readable medium of claim 21, wherein the instructions are operable such that the delivery rules are received from the subscribers.

52. The computer-readable medium of claim 21, wherein the instructions are operable such that the delivery rules include ground rules.

53. The computer-readable medium of claim 21, wherein the instructions are operable such that the delivery rules indicate to form a union or intersection of requests to generate the customized bundles.

54. The computer-readable medium of claim 21, wherein the instructions are operable such that the delivery rules serve to generate the customized bundles of optimal size that will satisfy the requests of several subscribers.

55. The computer-readable medium of claim 21, wherein the instructions are operable such that the delivery rules specify whether to generate a bundle with a different amount of the gathered information than at least one subscriber requested.

56. The computer-readable medium of claim 21, wherein the instructions are operable such that the delivery rules are defined by an agent manager.

57. The computer-readable medium of claim 56, wherein the instructions are operable such that the agent manager includes an entity that establishes a set of ground rules for an agent.

58. The computer-readable medium of claim 21, wherein the instructions are operable such that the delivery rules are defined by the subscribers.

59. The computer-readable medium of claim 21, wherein the instructions are operable such that the delivery rules indicate at least two of whether to complete a bundle, whether to fulfill partial orders, intervals at which the customized bundles are to be delivered to subscriber devices, and a form in which the customized bundles are to be delivered to the subscriber devices.

60. The computer-readable medium of claim 21, wherein the instructions are operable such that the delivery rules indicate whether to complete a bundle.

61. The computer-readable medium of claim 21, wherein the instructions are operable such that the delivery rules specify whether at least one subscriber wants at least one agent to complete a bundle.

62. The computer-readable medium of claim 21, wherein the instructions are operable such that the delivery rules indicate at least three of: whether to complete a bundle, whether to fulfill partial orders, intervals at which the customized bundles are to be delivered to the subscribers, and a form in which the customized bundles are to be delivered to the subscribers.

63. The computer-readable medium of claim 26, wherein the instructions are operable such that the delivering includes:
transmitting the multicast message to the subscribers using Internet multicast group addresses.

64. The computer-readable medium of claim 21, wherein at least one agent is included.

65. The computer-readable medium of claim 64, wherein the at least one agent is coupled to subscriber devices via at least one network.

66. The computer-readable medium of claim 65, wherein the at least one network that couples the at least one agent and the subscriber devices includes the Internet.

67. The computer-readable medium of claim 65, wherein the at least one network that couples the at least one agent and the subscriber devices includes at least one of a metropolitan area network (MAN), a local area network (LAN), or a public telephone network.

68. The computer-readable medium of claim 64, wherein the at least one agent is coupled to subscriber devices via a plurality of networks.

69. The computer-readable medium of claim 64, wherein the at least one agent is coupled to the information providers via at least one network.

70. The computer-readable medium of claim 69, wherein the at least one network includes the Internet.

71. The computer-readable medium of claim 69, wherein the at least one network includes at least one of a metropolitan area network (MAN), a local area network (LAN), or a public telephone network.

72. The computer-readable medium of claim 69, wherein the at least one network includes a wireless network.

73. The computer-readable medium of claim 64, wherein the at least one agent is coupled to the information providers via a plurality of networks.

74. The computer-readable medium of claim 64, wherein the at least one agent includes an entity with functions that are distributed over several devices.

75. The computer-readable medium of claim 74, wherein the entity includes a virtual entity.

76. The computer-readable medium of claim 64, wherein the at least one agent is implemented as software within a single device.

77. The computer-readable medium of claim 64, wherein the at least one agent includes a subscriber database.

78. The computer-readable medium of claim 64, wherein the at least one agent interfaces an external subscriber database.

79. The computer-readable medium of claim 21, wherein a subscriber database is included.

80. The computer-readable medium of claim 79, wherein the subscriber database includes a plurality of entries including a subscriber identifier field, a requests field, and a rules field.

81. The computer-readable medium of claim 79, wherein the subscriber database includes a plurality of entries including a subscriber identifier field.

82. The computer-readable medium of claim 81, wherein the subscriber identifier field stores a unique identifier for a particular subscriber or group of subscribers.

83. The computer-readable medium of claim 81, wherein the subscriber identifier field stores a unique identifier for a group of subscribers.

84. The computer-readable medium of claim 79, wherein the subscriber database includes a plurality of entries including a requests field.

85. The computer-readable medium of claim 84, wherein the requests field indicates the requested information that the subscriber desires.

86. The computer-readable medium of claim 79, wherein the subscriber database includes a plurality of entries including a rules field including the delivery rules.

87. The computer-readable medium of claim 21, wherein the instructions are operable such that the delivery rules are defined by an agent manager that is a person.

88. The computer-readable medium of claim 21, wherein the instructions are operable such that the delivery rules are defined by an agent manager that is a system.

89. The computer-readable medium of claim 79, wherein the subscriber database controls the bundling.

90. The computer-readable medium of claim 21, and further comprising:
receiving a contact from a new subscriber to be registered.

91. The computer-readable medium of claim 90, and further comprising:
generating a subscriber identifier for the new subscriber.

92. The computer-readable medium of claim 91, wherein the instructions are operable such that the subscriber identifier is automatically generated using a numeric or alphanumeric identifier for the new subscriber.

93. The computer-readable medium of claim 21, and further comprising:
prompting a new subscriber for information that the new subscriber desires to receive.

94. The computer-readable medium of claim 93, wherein the instructions are operable such that the prompting includes presenting the new subscriber with a list of available information services, and the new subscriber is permitted to select from the list.

95. The computer-readable medium of claim 94, and further comprising:
receiving a request notification from the new subscriber indicating the information services that the new subscriber desires.

96. The computer-readable medium of claim 93, and further comprising:
prompting the new subscriber for the delivery rules.

97. The computer-readable medium of claim 93, and further comprising:
an agent identifying the information provider that provides the requested information if the new subscriber requests information that the agent does not already obtain for another subscriber.

98. The computer-readable medium of claim 21, wherein the instructions are operable such that the delivery rules specify whether to form a union of the requests.

99. The computer-readable medium of claim 21, wherein the instructions are operable such that the delivery rules specify whether to form an intersection of the requests.

100. The computer-readable medium of claim 21, wherein the instructions are operable such that the requested information includes stock quotes.

101. The computer-readable medium of claim 21, wherein the instructions are operable such that the requested information includes weather reports and sports reports.

102. The computer-readable medium of claim 21, wherein the non-transitory computer-readable medium comprises a single storage device.

103. The computer-readable medium of claim 21, wherein the non-transitory computer-readable medium comprises a plurality of storage devices.

104. The computer-readable medium of claim 103, wherein the plurality of storage devices are geographically distributed in a network.

105. The computer-readable medium of claim 21, wherein the instructions are operable such that the bundles comprise datagrams.

106. The computer-readable medium of claim 21, wherein the instructions are operable such that the bundles comprise packets.

107. The computer-readable medium of claim 21, wherein the information is gathered directly from the plurality of information providers.

108. A non-transitory computer-readable medium that stores instructions executable by at least one processor to perform a method for providing information to a plurality of subscribers, comprising:
gathering information from a plurality of information providers;
packaging at least some of the gathered information into customized bundles based on a plurality of information requests and delivery rules, the information requests including requests from the subscribers for different types of information, the delivery rules including rules that control delivery of the requested information; and
delivering the customized bundles to the subscribers according to the delivery rules, the customized bundles being delivered utilizing multicast messages;
wherein the instructions are operable such that available information services are presented that supply the different types of information for receiving a selection of one or more of the information services, and the rules include one or more subscriber rules that are based on subscriber input and that dictate a manner of delivery of the requested information, and one or more general delivery rules that pertain to the subscribers.

109. A non-transitory computer-readable medium that stores instructions executable by at least one processor to perform a method for providing information to a plurality of subscribers, comprising:
gathering information from a plurality of information providers without necessarily requiring manual data entry of all of the information;
packaging at least some of the gathered information into bundles based on a plurality of information requests and delivery rules, the information requests including requests from the subscribers for different types of information, the delivery rules including rules that control delivery of the requested information; and
delivering the bundles to the subscribers according to the delivery rules;
wherein the instructions are operable such that available information services are presented that supply the different types of information for receiving a selection of one or more of the information services, and the rules include one or more subscriber rules that are based on subscriber input and that dictate a manner of delivery of the requested information, and one or more general delivery rules that pertain to a plurality of the subscribers.

* * * * *